3,408,155
SUPERSATURATED BORAX SOLUTION STABILIZED WITH SODIUM DICHROMATE AND METHOD OF MAKING SAME
Joseph G. Bower, Santa Ana, Calif., assignor to United States Borax & Chemical Corporation, Los Angeles, Calif., a corporation of Nevada
No Drawing. Filed Sept. 29, 1965, Ser. No. 491,411
6 Claims. (Cl. 23—59)

ABSTRACT OF THE DISCLOSURE

A method for producing a clear stable supersaturated solution of borax containing as a stabilizer therefor an alkali metal dichromate or a mixture of alkali metal dichromate and alkali metal hydrogen arsenate and product produced thereby.

This invention relates to supersaturated solutions of sodium borates. More particularly, this invention relates to a supersaturated solution of borax, that is, a solution which is dissolved in its own water of crystallization.

The general concept of producing a supersaturated borax solution which is essentially dissolved in its own water of crystallization is already well known. Unfortunately, all supersaturated solutions have a strong tendency to crystallize the solute out of the solution over a period of time. The crystallization may take effect for a number of reasons, for instance, by the inadvertent inclusion of nuclei upon which seed crystals may form. In order to overcome the lack of stability of supersaturated borax solutions, stabilizing inorganic compounds have been added. For instance, it is known to add alkali phosphates and phosphoric acid in order to stabilize a supersaturated borax solution.

As a result of such prior knowledge, additional efforts have been made in order to develop other stabilizing salts. For instance, various highly soluble hydrated sodium and potassium salts of weak oxygenated acids have been utilized. However, in most instances, the vast number of such salts are ineffective, or are only moderately effective.

Accordingly, it is a primary object of the present invention to disclose a method for producing a clear supersaturated solution of borax stabilized with an alkali metal dichromate or a mixture of alkali metal dichromate and alkali metal hydrogen arsenate.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

The present invention contemplates the general concept of producing a supersaturated solution of borax, that is, a solution of borax in its own water of crystallization which is stabilized by the further inclusion of a quantity of an alkali dichromate and mixtures of alkali metal dichromate and alkali metal hydrogen arsenate. The borax utilized is the decahydrated sodium tetraborate. The preferred alkali metal salts are sodium dichromate ($Na_2Cr_2O_7 \cdot 2H_2O$) and disodium hydrogen arsenate ($Na_2HAsO_4 \cdot 7H_2O$).

It has been found that unexpected additional properties are obtained by utilizing the sodium dichromate and mixture of sodium dichromate and disodium hydrogen arsenate as stabilizers. For instance, inasmuch as sodium dichromate is a well-known oxidizing agent, the inclusion of this material in the supersaturated solution of the present invention results in an oxidizing solution as well as a saturated sodium borate solution. Additionally, in view of the well known property of sodium dichromate and disodium hydrogen arsenate as germicidal agents, the highly concentrated supersaturated borax solution of the present invention may be utilized in conjunction with a combination of cleaning and sterilization operations.

Naturally, the stabilized solution of the present invention affords a borax solution which is mobile, dense and readily dispersible for dilution. In preservation or fire-retardation of wood, the supersaturated borax solution of the present invention allows room temperature impregnation at far higher levels of sodium borate concentration than have been used previously, and at the same time, both the preservative and flame retarding property of borax are strongly enhanced by the choice of the stabilizing salts, namely, sodium dichromate or a mixture of sodium dichromate and disodium hydrogen arsenate.

In carrying out the concepts of the present invention, sodium tetraborate decahydrate is mixed with sodium dichromate or a mixture of sodium dichromate and disodium hydrogen arsenate so that the admixture is very intimate. Then the mixture is heated to approximately 100° C. with continued stirring. It will be seen that the mass is liquefied as the salts dissolve in their own water of crystallization while the temperature of 100° C. is maintained over a period of time accompanied with stirring throughout. The liquid mixture gradually becomes clearer except for some air bubbles which also disappear upon further stirring. Thereafter, the solution is rapidly chilled to room temperature. In order to obtain effective results, it is necessary during the heating step to prevent evaporation of water and formation of crust as potential seed crystals on the surface of the liquid.

The period of time during which the solution remains clear is dependent somewhat upon the quantity of the ingredients employed and more importantly the technique utilized in effecting the dissolution of the salts without inclusion of nuclei which are deleterious to the maintenance of a clear solution. Additionally, it was found that greater stability of the resultant is obtainable when the solution is maintained in a sealed container.

In carrying out the present invention some limits are to be observed. It was found, for instance, that effective values of the invention may be obtained when the quantity of the sodium dichromate employed is as low as 30% by weight of the total mixture of sodium borax decahydrate and sodium dichromate and up to 50% by weight as a higher useful point. Naturally, intermediate levels within this range produced intermediate periods of time during which the supersaturated solution was maintained in a clear and stable condition. When disodium hydrogen arsenate is included, the sodium dichromate is in a range of approximately 10% to 30% by weight, while the disodium hydrogen arsenate is in a range of approximately 10% to 30% by weight. The borax is in a range of approximately 40% to 80% by weight.

Example I

Sodium tetraborate decahydrate in a quantity of 70 grams was mixed with 30 grams of sodium dichromate ($Na_2Cr_2O_7 \cdot 2H_2O$); stirring was effected for a period of time to insure intimate contact of the salts. The mixture was heated as stated in the above to approximately 100° C. Interaction was noted as the salts were liquefied by dissolution in their water of crystallization. The stirring was continued for approximately 10 to 15 minutes while maintaining a temperature of approximately 100° C. resulting in clarification of the solution. Thereafter, the solution was rapidly chilled to room temperature and maintained in a sealed container thereafter. The stability of this solution was approximately 14 days.

Example II

In this example the same ingredients were employed and the same technique in producing the solution was also employed. However, the quantity of sodium tetraborate decahydrate was 60 grams and the quantity of sodium dichromate employed was 40 grams. The resultant supersaturated clear solution was found to be stable for a period of approximately 14 days.

Example III

In this example the same techniques were employed as in connection with Example I but the quantities of the ingredients employed was 50 grams of sodium tetraborate decahydrate and 50 grams of sodium dichromate. This solution was stable for only seven days.

Example IV

In this example the same techniques were employed as in the above but disodium hydrogen arsenate was also included. The quantities employed were as follows: 60 grams of sodium tetraborate, 20 grams of sodium dichromate and 20 grams of disodium arsenate. The resultant solution was stable for approximately thirty days.

In a variance of the technique in achieving a liquid supersaturated solution it was found that an alternative method could be used wherein the solid salts were first dissolved in water. These salts were then concentrated to a supersaturated condition for evaporation while heated to approximately 100° C. This technique produced clear, viscous solutions.

The resulting solutions produced by the techniques of the present invention have a specific gravity of approximately 1.7.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. The process for preparing a clear, stable supersaturated solution of borax comprising mixing approximately 7 to 5 parts by weight of borax and approximately 3 to 5 parts by weight of sodium dichromate in water, concentrating said solution to a condition of supersaturation, heating the mixture to approximately 100° C. with stirring and preventing the evaporation of water, then rapidly cooling the mixture to room temperature whereby a clear solution is maintained.

2. The process for preparing a clear, stable supersaturated solution of borax wherein the borax is dissolved only in its water of crystallization comprising mixing approximately 7 to 5 parts by weight sodium tetraborate decahydrate and approximately 3 to 5 parts by weight sodium dichromate, heating the mixture to approximately 100° C. with stirring and preventing the evaporation of water until said mixture becomes a clear liquid, then rapidly cooling the mixture to room temperature whereby the clear solution is maintained.

3. A clear, stable supersaturated solution of borax comprising approximately 3 to 5 parts by weight sodium dichromate and approximately 7 to 5 parts by weight sodium tetraborate decahydrate, said salts being dissolved in only their water of crystallization.

4. The process for preparing a clear, stable supersaturated solution of borax comprising dissolving approximately 4 to 8 parts by weight of borax and approximately 3 to 1 parts by weight of sodium dichromate and approximately 3 to 1 parts by weight of sodium hydrogen arsenate in water, concentrating said solution to a condition of supersaturation, heating the mixture to approximately 100° C. with stirring and preventing the evaporation of water, then rapidly cooling the mixture to room temperature whereby a clear solution is maintained.

5. The process for preparing a clear, stable supersaturated solution of borax wherein the borax is dissolved only in its water of crystallization comprising mixing approximately 4 to 8 parts by weight sodium tetraborate decahydrate and approximately 3 to 1 parts by weight sodium dichromate and 3 to 1 parts by weight disodium hydrogen arsenate, heating the mixture to approximately 100° C. with stirring and preventing the evaporation of water until said mixture becomes a clear liquid, then rapidly cooling the mixture to room temperature whereby the clear solution is maintained.

6. A clear, stable supersaturated solution of borax comprising approximately 4 to 8 parts by weight sodium tetraborate decahydrate and approximately 3 to 1 parts by weight sodium dichromate and 3 to 1 parts by weight disodium hydrogen arsenate, said salts being dissolved in only their water of crystallization.

References Cited

UNITED STATES PATENTS

| | | | |
|---|---|---|---|
| 2,774,070 | 12/1956 | Taylor et al. | 23—59 |
| 2,805,915 | 9/1957 | Rohrback | 23—59 X |

OSCAR R. VERTIZ, *Primary Examiner.*

H. T. CARTER, *Assistant Examiner.*